May 5, 1959 C. A. BRICTSON 2,885,518
BOOT FOR THE END PORTION OF A DIMMER SWITCH PLUNGER
Filed April 7, 1958
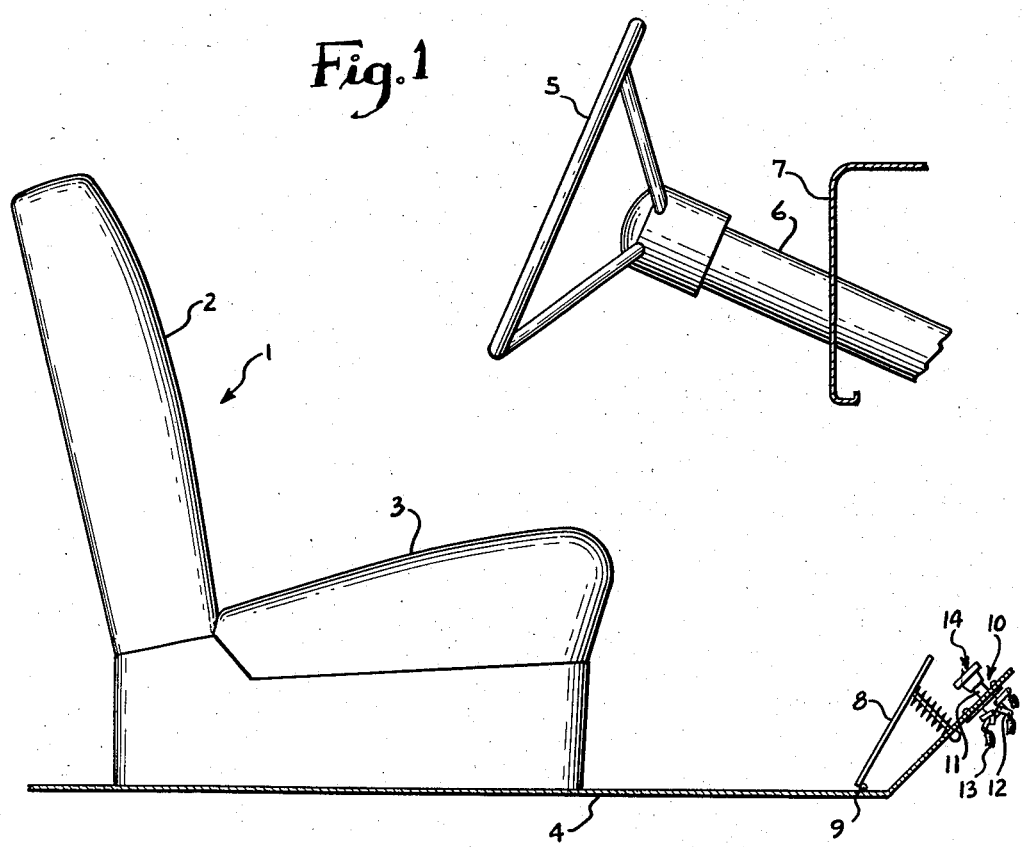
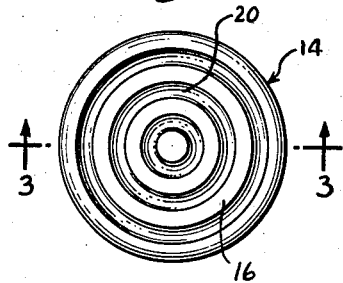
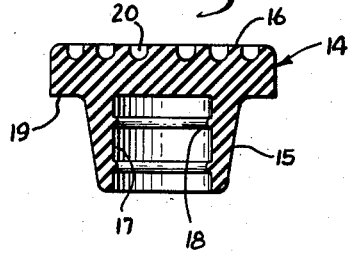
INVENTOR
CASPER A. BRICTSON
by: Gary, Desmond & Parker
ATTYS.

United States Patent Office 2,885,518
Patented May 5, 1959

2,885,518
BOOT FOR THE END PORTION OF A DIMMER SWITCH PLUNGER

Casper A. Brictson, Chicago, Ill.

Application April 7, 1958, Serial No. 726,733

3 Claims. (Cl. 200—172)

This invention relates to improvements in a boot or pad which may be positioned over the end of the projecting plunger of a dimmer switch employed to control the headlights of an automobile.

One of the objects of the present invention resides in the provision of a pad device constructed of resilient material such as rubber or the like which may be frictionally mounted upon the end of the plunger of a conventional dimmer switch for controlling the headlights of an automobile, the device being removably positionable upon the end of the plunger to enlarge and soften the surface which is contacted by the foot of the operator when the switch is manipulated.

The plunger of the usual dimmer switch is normally of relatively small diameter and is made from metal with rounded edges. Night driving on highways makes necessary frequent use of the dimmer switch and a dimmer switch is so positioned that it protrudes from the front floor of every car, to the left of the accelerator and brake pedals, which are also foot operated. A dimmer switch is an operating function of an automobile, that is invariably "felt for" and not "looked for," by the operator. Consequently the present invention increases the effective size of the dimmer switch plunger, makes it easier to find and to reach, besides providing a nonslip, nonskid surface. It is particularly advantageous to women drivers, since the soles of their shoes are usually narrower, thinner, and relatively smaller which makes it more difficult to find the dimmer switch and also easier to slip off the rounded metal top of the usual dimmer switch.

A feature of the present invention resides in a boot or pad for the plunger of a dimmer switch which makes the operating plunger more prominent in size and assists the operator in blindly finding the plunger with his foot.

Other objects and advantages of the present invention will be apparent from the accompanying drawing and following detailed description.

In the drawing,

Fig. 1 is a diagrammatic view of the driver's compartment of a conventional automobile.

Fig. 2 is an enlarged top plan view of the boot or pad embodying the present invention.

Fig. 3 is a sectional view taken on line 3—3 of Fig. 2.

Referring in detail to the drawing, 1 indicates the front seat of an automobile, said seat comprising the usual back cushion 2 and seat cushion 3, said seat being carried by floor 4. A conventional steering wheel 5 is carried by the steering post or column 6 which extends through dash 7. Adjacent the forward portion of the floor 4 a conventional accelerator pedal 8 is hingedly positioned, as at 9, the accelerator pedal being disposed adjacent the driver's right foot when he occupies the driving position.

Adjacent the driver's left foot, when he is in driving position, a conventional dimmer switch 10 is positioned, said switch comprising a reciprocating spring-pressed plunger 11 and suitable binding posts 12 which connect the switch, proper, to the battery and the filaments of the headlights (not shown) by means of conductors 13. The switch 10 is of the type wherein successive actuations of the plunger disconnects one circuit and connects the other circuit.

As a feature of the present invention a boot or pad 14 is frictionally positioned over the end of plunger 11. The boot 14 is constructed of a relatively resilient material such as rubber and comprises a neck portion 15 and a pad or platform portion 16. The neck portion 15 is provided with a cylindrical bore 17 of a diameter which will snugly fit over the end of the usual plunger 11. Annular beads 18 are carried in spaced relationship to each other on the wall of the bore 17 whereby when said boot is positioned on the plunger said beads are deformed and make relatively snug frictional contact with the plunger.

The platform or pad portion 14 is relatively thick and is of a diameter greater than the neck portion 15, providing an overhanging annular ledge 19. The upper face of the platform portion is provided with relatively deep concentric grooves 20 spaced relatively closely to each other to soften the upper or foot-contacting portion of the boot whereby to cushion the contact of the operator's foot. Of course, other types of grooved or recessed patterns may be formed upon the contact face of the boot, but in all cases the recesses or grooves are preferably relatively deep and relatively close to each other.

It can readily be seen that by virtue of the enlarged diameter of the platform portion 16 the area of contact with the operator's foot is enlarged relative to the area of the end of the plunger 11. In addition, with the boot 14 carried by the plunger, the plunger becomes enlarged and is easier to locate by the operator whose left foot, of necessity, must grope blindly for the plunger.

I claim as my invention:

1. A boot for the plunger of an automobile headlight dimmer switch which comprises, a body of resilient material, said body comprising a neck portion and a substantially planar flange portion, said neck portion being provided with a bore for receiving the end portion of a dimmer switch plunger, said flange portion being disposed with its plane at substantially right-angles to the axis of the neck portion and the bore and being of large area relative to the cross-sectional area of said bore.

2. A boot for the plunger of an automobile headlight dimmer switch which comprises, a body of resilient material, said body comprising a neck portion and a substantially planar flange portion, said neck portion integral therewith being provided with a bore for receiving the end portion of a dimmer switch plunger, said flange portion being disposed with its plane at substantially right-angles to the axis of the neck and carried at one end of the neck, said flange portion being of large area relative to the cross-sectional area of said bore, the flange portion being provided with a plurality of relatively closely adjacent, relatively deep grooves opening to the face of the flange portion opposite to the neck portion.

3. A boot for the plunger of an automobile headlight dimmer switch which comprises, a body of resilient material, said body comprising a neck portion and a relatively planar disc portion, said neck portion integrally joined thereto being provided with a bore for receiving the end portion of a dimmer switch plunger, said disc portion being disposed with its plane at substantially right-angles to the axis of the neck and the bore at an end of said neck portion and being of large area relative to the cross-sectional area of said bore and having its peripheral edge unsupported, the disc portion being provided with a plurality of relatively closely adjacent, relatively deep grooves opening to the face of the disc portion opposite to the neck portion, and a plurality of integral annular ribs carried by the inner wall of the bore for frictionally gripping the end portion of the plunger.

References Cited in the file of this patent

UNITED STATES PATENTS

| | | |
|---|---|---|
| 2,584,883 | Karsch | Feb. 5, 1952 |
| 2,627,006 | Lawson et al. | Jan. 27, 1953 |